US010462734B2

(12) United States Patent
Tan

(10) Patent No.: US 10,462,734 B2
(45) Date of Patent: Oct. 29, 2019

(54) METHOD, APPARATUS AND SYSTEM WITH CARRIER NETWORK SWITCHING CONTROL

(71) Applicant: Google LLC, Mountain View, CA (US)

(72) Inventor: Weihua Tan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/338,819

(22) Filed: Oct. 31, 2016

(65) Prior Publication Data
US 2018/0124692 A1  May 3, 2018

(51) Int. Cl.
 H04W 48/18 (2009.01)
 H04W 60/04 (2009.01)
 H04W 52/02 (2009.01)

(52) U.S. Cl.
 CPC ....... *H04W 48/18* (2013.01); *H04W 52/0216* (2013.01); *H04W 52/0229* (2013.01);
 (Continued)

(58) Field of Classification Search
 CPC .. H04W 48/18; H04W 52/0229; H04W 60/04
 (Continued)

(56) References Cited

U.S. PATENT DOCUMENTS 6,381,315 B1  4/2002  Nhaissi
7,180,898 B2  2/2007  Yoshida et al.
(Continued)

FOREIGN PATENT DOCUMENTS

EP  1885144 A2  2/2008
EP  2244502 A1  10/2010
(Continued)

OTHER PUBLICATIONS

Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.
(Continued)

*Primary Examiner* — Shahriar Behnamian
(74) *Attorney, Agent, or Firm* — Honigman LLP; Brett A. Krueger

(57) ABSTRACT

An apparatus, such as a wireless mobile device dynamically obtains configuration information for a plurality of different network switching decision modules from a server in response to a detected network condition change event. The server responds with network switching decision module configuration information which serves as configuration information for a plurality of different network switching decision modules on the wireless mobile device. The wireless mobile device selectively invokes the plurality of network switching decision modules that are enabled by the obtained configuration information from the server. Each of the enabled network switching decision modules performs its respective switching decision process and outputs its decision in the form of network switching decision data. The network switching decision data from each of the invoked network switching decision modules is evaluated to determine whether switching should occur from a current network to another network.

12 Claims, 6 Drawing Sheets

(52) U.S. Cl.
CPC ............. *H04W 60/04* (2013.01); *Y02D 70/00* (2018.01); *Y02D 70/1262* (2018.01); *Y02D 70/142* (2018.01); *Y02D 70/144* (2018.01); *Y02D 70/20* (2018.01); *Y02D 70/26* (2018.01)

(58) Field of Classification Search
USPC ....... 455/435.3, 435.1, 435.2, 436, 439, 448
See application file for complete search history.

(56) References Cited

U.S. PATENT DOCUMENTS

| | | | |
|---|---|---|---|
| 7,433,929 | B2 | 10/2008 | Guilford et al. |
| 7,809,360 | B2 | 10/2010 | Agrawal et al. |
| 8,391,192 | B2 | 3/2013 | Prakash et al. |
| 8,484,568 | B2 | 7/2013 | Rados et al. |
| 8,590,023 | B2 | 11/2013 | Gupta et al. |
| 10,051,533 | B2 * | 8/2018 | Fitzpatrick ............ H04W 48/18 |
| 10,237,722 | B2 * | 3/2019 | Chen ...................... H04W 76/18 |
| 2002/0169716 | A1 | 11/2002 | Johnson et al. |
| 2004/0246920 | A1 | 12/2004 | Savolainen |
| 2007/0037550 | A1 | 2/2007 | Armstrong et al. |
| 2007/0147317 | A1 | 6/2007 | Smith et al. |
| 2008/0009279 | A1 | 1/2008 | Sakawa |
| 2008/0107051 | A1 | 5/2008 | Chen et al. |
| 2009/0061862 | A1 | 3/2009 | Alberth, Jr. et al. |
| 2009/0298467 | A1 | 12/2009 | Zohar |
| 2010/0304737 | A1 | 12/2010 | Jain et al. |
| 2011/0096673 | A1 | 4/2011 | Stevenson et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0282915 | A1 | 11/2012 | Haynes et al. |
| 2013/0040693 | A1 | 2/2013 | Chen et al. |
| 2013/0148567 | A1 | 6/2013 | Efrati et al. |
| 2013/0155842 | A1 | 6/2013 | Moore et al. |
| 2013/0203438 | A1 | 8/2013 | Shin |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0215773 | A1 * | 7/2015 | Bai ....................... H04W 8/183 455/418 |
| 2015/0281198 | A1 | 10/2015 | Lee et al. |
| 2015/0296369 | A1 * | 10/2015 | Berionne .............. H04W 8/183 455/418 |
| 2016/0014280 | A1 * | 1/2016 | Brunsman ........... H04M 15/774 455/407 |
| 2016/0037340 | A1 | 2/2016 | Rayment et al. |
| 2016/0261596 | A1 | 9/2016 | Khello et al. |
| 2017/0134945 | A1 * | 5/2017 | Goel ..................... H04W 12/06 |
| 2017/0289788 | A1 * | 10/2017 | Lalwaney ........... H04L 41/0803 |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008-060464 A2 | 5/2008 |
| WO | 2011-162688 A1 | 12/2011 |
| WO | 2014-011094 A1 | 1/2014 |
| WO | 2015-158263 A1 | 10/2015 |

OTHER PUBLICATIONS

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

Bircher et al., "An Agent-Based Architecture for Service Discovery and Negotiation in Wireless Networks," University of Bern, Wired/Wireless Internet Comms. (WWIC), Jan. 21, 2004.

Levy, Martyn, "Best-Practice Authentication Methods for Wi-Fi Offload," http://www.acurixnetworks.com/single-post/2013/05/20/BestPractice-Authentication-Methods-For-WiFi-Offload, May 20, 2013.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

Venkiteswaran, Sriram, "Google Project Fi—New Era for Mobile Technology?", http://blog.mojonetworks.com/google-project-fi-new-era-for-mobile-technology, MojoBlog, May 19, 2015.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Nikravesh et al., "Mobile Network Performance from User Devices: A Longitudinal, Multidimensional Analysis," Passive and Active Measurement: 15th International Conference, PAM 2014, Mar. 10-11, 2014.

Aptilo Inc.; "EAP-SIM and EAP-AKA authentication for mobile devices"; from https://web.archive.org/web/20160303105429/https://www.aptilo.com/aptilo-eap-sim-authentication-server/eap-sim-ada; Mar. 3, 2016.

Aptilo Inc.; "Innovative Wi-Fi Offload features"; from https://web.archive.org/web/20160303095650/https://www.aptilo.com/mobile-data-offloading/innovative-wifi-offload-features; Mar. 3, 2016.

Sensorly, "With Sensorly you can . . . " www.sensorly.com; accessed Apr. 21, 2016.

Movirtu, "Virtual SIM Platform: Decoupling the identity from the SIM card"; www.movirtu.com; accessed Mar. 22, 2016.

Alcatel Lucent; "7750 Service Router Mobile Offload"; Mar. 2016.

* cited by examiner

METHOD, APPARATUS AND SYSTEM WITH CARRIER NETWORK SWITCHING CONTROL

TECHNICAL FIELD

The disclosure relates generally to methods, apparatus and systems that switch among different wireless carrier networks.

BACKGROUND OF THE DISCLOSURE

Wireless mobile devices such as cell phones, tablets, laptops, wearables and other devices can now talk to more than one network carrier and switch between differing carrier networks. Differing networks may include differing wireless wide area networks (WWAN) such as differing cellular networks that communicate using different radio access technologies (RATs such as GSM, 4G LTE or other radio access technologies) as well as among wireless local area networks (WLAN) such as Wi-Fi networks. For example, where the wireless mobile device can switch among different carriers of different cellular networks (whether they use the same RAT or different RAT's) the mobile devices may automatically switch between different carriers to connect to another network to improve the strength of the current connection. The connection may be a voice call or data communication for example. Such wireless mobile devices may employ multiple SIM profiles, such as one profile for one carrier and another profile for another carrier.

Cellular carrier profile switching occurs by selecting a best carrier SIM profile based on differing geographic locations of the mobile device, time of day, and other network conditions. One of multiple carrier SIM profiles is used at a time and a network carrier switching algorithm, in the form of an executing code component is used that runs on the mobile device. However, a single carrier switching algorithm may not always choose the best carrier SIM profile. By way of example, one carrier switching algorithm may select a carrier in an urban area that may perform badly in a rural area. In designs where two different switching algorithms are used, they are typically mutually exclusive in that only one is run at a time and static since once they are running in an application they are not changed. They may have different decision making processes for the same geographic location and may conflict.

One solution to avoid carrier switching algorithm conflict is to only run a single algorithm at a time or have a user manually select an algorithm to run. However, this can result in an undesirable network switching choice that may cause a lower quality connection resulting in poor device performance.

BRIEF DESCRIPTION OF THE DRAWINGS

The disclosure will be more readily understood in view of the following description when accompanied by the below figures and wherein like reference numerals represent like elements, wherein.

SUMMARY OF THE DISCLOSURE

Figure 1:
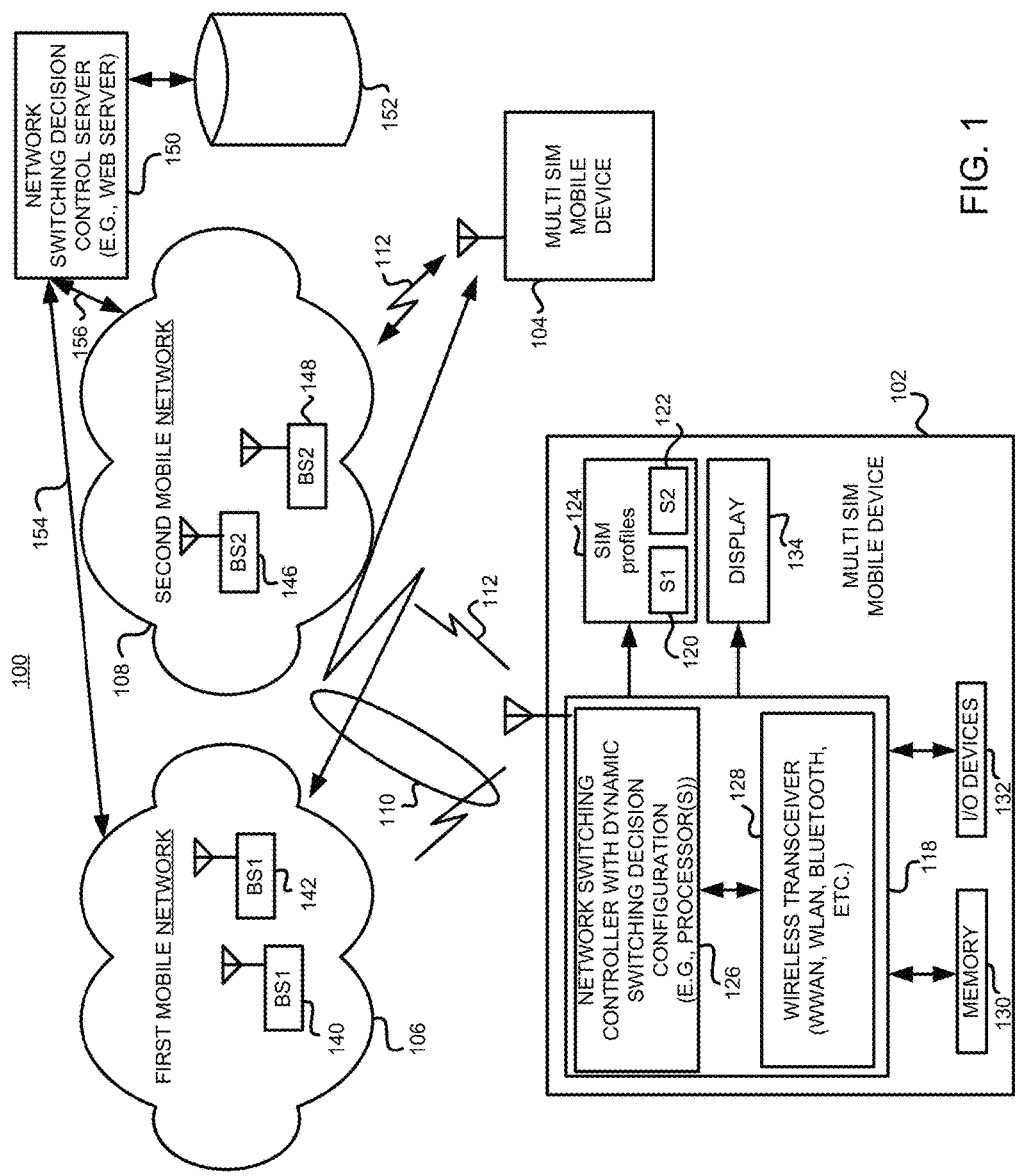
FIG. 1 is a block diagram generally illustrating a communication system employing wireless mobile devices that employ multiple SIM profiles in accordance with one example set forth in the disclosure.

Methods, apparatus and systems set forth below can provide a type of dynamic control of multiple network switching decision modules in a wireless mobile device through centralized control via a server. Multiple network switching decision modules (e.g., configured as loaded and executable stored code such as plugins) can be dynamically enabled on a wireless mobile device which then provide respective network switching decisions that are evaluated to determine if a network switch should occur to a different carrier network. Only enabled network switching decision modules are dynamically invoked in response to a network condition change event and conflicts among the differing network switching decisions from the network switching decision modules are resolved. Executable network switching decision code components can also be stored at the server and wirelessly provisioned to the mobile device to provide new or updated network switching decision module operation on the wireless device. Consideration of whether the decision to switch networks will cause usage interruption may also be employed. For example, it may be desirable to avoid switching to a different carrier network during a phone call because the switch would cause a phone call to drop. The above framework also allows for experimental network switching decision algorithms to be enabled and disabled remotely by a server to enhance the development of experimental network switching decision algorithms.

In one example, an apparatus, such as a wireless mobile device dynamically obtains configuration information for a plurality of different network switching decision modules from a server in response to a detected network condition change event. The server responds with network switching decision module configuration information which serves as configuration information for a plurality of different network switching decision modules on the wireless mobile device. Dynamically obtaining the configuration information provides the ability to change the network switching algorithms that are used by the wireless mobile device each time a network condition change event is detected. In one example, the wireless mobile device also detects the network condition change event and issues the network switching decision query to the server, such as a web server, each time an appropriate network condition change event is detected. The configuration information is provided by the server so that different network switching decision modules can be activated remotely by the server under control of an administrator.

The wireless mobile device, in response to dynamically obtaining the configuration information for the plurality of different network switching decision modules from the server, selectively invokes the plurality of network switching decision modules that are enabled by the obtained configuration information from the server. For example, if four different network switching decision modules (corresponding to four different switching algorithms) are on a wireless mobile device, the obtained configuration information from the server may only enable two of the network switching decision modules. Each of the enabled network switching decision modules performs its respective switching decision process and outputs its decision in the form of network switching decision data. The network switching decision data from each of the invoked network switching decision modules is evaluated to determine whether switching should occur from a current network to another network using the appropriate SIM profile to switch to a different carrier network from a current carrier network. If switching is to occur, the wireless mobile device then communicates on the other network using the other SIM profile. The wireless mobile device may have more than two SIM profiles and can be configured to switch among more than two networks.

To reduce battery power consumption, in one example, the wireless mobile device employs a network SIM switching controller and wakes up the network SIM switching controller by using an operating system, in response to the network condition change event. After the network SIM switching controller is awake, the network SIM switching controller dynamically obtains the configuration information for the wireless mobile device from the server and selectively invokes the network switching decision modules on the wireless mobile device that are enabled by the obtained configuration information from the server. After a switching decision is made as to whether to switch to a different carrier network, the wireless mobile device, through for example the operating system, then places the network SIM switching controller in a reduced power state until another network change condition event causes a wakeup of the network SIM switching controller.

In one example, the server maintains a database that is populated through a suitable user interface such as a graphics user interface or voice activated intake. The server receive a network switching decision query, from the wireless mobile device, for configuration information associated with a plurality of different network switching decision modules on the wireless mobile device. The query is sent in response to a network condition change event detected by the wireless mobile device. The server provides to the wireless mobile device in response to the network switching decision query, configuration information for configuring the plurality of different network switching decision modules on the wireless mobile device. A corresponding storage medium that includes executable instructions that when executed by one or more processors to carry out the server operations is also disclosed.

The server registers the wireless mobile device with a plurality of different network switching decision modules such as by storing linked configuration information for the plurality of different network switching decision modules that includes at least one of: data indicating that a particular network switching decision module is enabled for the wireless mobile device and data indicating a priority level of a particular network switching decision module. In one example, registering the wireless mobile device includes presenting a user interface that provides selectability of data (such as via graphic buttons) representing which of the plurality of different network switching decision modules are to be enabled on the wireless mobile device.

Registration includes storing data in a database that includes data that identifies the wireless mobile device in any desirable way. This requesting entity identification information may be any suitable information including but not limited to a device group ID based on a state of the device such as the location of the device, particular software that is enabled on the device (such as an operating system version) or any other suitable identification information. Network switching decision module identification data is also stored for each of the identified mobile devices which identifies each network switching decision module that is on the wireless mobile device. Associated with each identified network switching decision module is configuration information such as whether the identified network switching decision module should be enabled or disabled on the mobile device, priority data for each network switching decision module that indicates a priority that should be given to the switching decision data that a respective module generates. Any other suitable configuration data may also be employed. The priority data allows the wireless mobile device to prioritize network switching decision data among the plurality of selectively invoked network switching decision modules that are identified as being enabled on the wireless mobile device.

In one example, a non-transitory storage medium includes executable instructions that when executed, causes one or more processors to dynamically obtain from a server, configuration information for a plurality of different network switching decision modules on the wireless mobile device, in response to a detected network condition change event. The one or more processes selectively invokes the plurality of network switching decision modules that are enabled by the obtained configuration information and obtains network switching decision data from each of the invoked network switching decision modules. The one or more processors cause switching by the wireless transceiver, from the first network to the second network using the second SIM profile based on the switching decision data from the plurality of invoked network switching decision modules. The one or more processors cause the mobile device to communicate on the second network. The storage medium in one example also stores executable instructions to carry out other operations such as detecting a network condition change event including an event that requires a determination of whether to switch from the first network to the second network using the second SIM profile and other operations of the wireless device.

DETAILED DESCRIPTION OF EMBODIMENTS

Example embodiments provide one or more technical solutions that address one or more of the above problems, and/or other problems, by enabling a wireless mobile device to dynamically obtain, from a remote server, configuration information for a number of different network switching decision modules each of which carry out a different network switching decision algorithm on the wireless mobile device. The wireless mobile device selectively invokes only the network switching decision modules that are enabled by the obtained configuration information thereby providing selectable network switching decision operations on the mobile device to enhance a decision as to whether or not to switch to a different carrier network. Also, multiple network switching decision modules provide respective network decision data which are considered together and which may be prioritized so that mutually exclusive decision algorithm problems are avoided. The wireless mobile device may approve or reject a decision based on any suitable criteria such as but not limited to looking at a confidence level of the decision data, priority data of a respective network switching decision module and/or whether the decision will cause usage interruption. Also, employing the operations described herein can facilitate the improvement of varying switching decisions by facilitating experimental operation of differing network switching decision modules that are being evaluated for experimental purposes on the wireless mobile device.

FIG. 1 illustrates one example of a communication system 100 that includes a plurality of multi-SIM profile wireless mobile devices 102 and 104 that can communicate with a plurality of different carrier networks 106 and 108 via wireless communication channels 110 and 112, respectively. The wireless networks 106 and 108 may be any suitable wireless networks that are operated by different carriers such as GSM networks, LTE networks or other suitable WWAN networks. For purposes of illustration, they will be referred to also as WWAN cellular networks. The wireless mobile device 102 includes a network switching controller with dynamic switching decision configuration 126 that accesses multiple SIM profiles 120 and 122 that are stored in memory 124. The memory 124 may be part of one or more SIM cards or other suitable data storage structure.

A mobile communication unit 118 includes any suitable radio access technology interface circuitry and control circuitry to allow communication with the differing wireless networks 106 and 108 as known in the art, and in addition, includes a network switching controller with dynamic switching decision configuration 126 (also referred to herein as network switching controller 126) that may include or have access to a wireless transceiver 128 to provide wireless communication to the differing carrier networks 106, 108, WLAN networks, and may also provide Bluetooth peer-to-peer communication or any other suitable wireless communication. Mobile device 102 also includes memory 130 such as RAM, ROM or other suitable memory that stores executable code that when executed by one or more processors, causes the one or more processors to operate as the network switching controller with dynamic switching decision configuration 126 as described herein. The mobile device 102 includes known input/output devices 132 such as but not limited to, touchpad interfaces, audible interfaces and any other suitable input/output devices as desired. Wireless mobile device 104 includes the same functions as the mobile device 102. The mobile device 102 includes a display 134, which may be part of a touch panel display as known in the art to effect communication on networks 106 and 108 and any other networks. The mobile communication unit 118 includes any suitable baseband processors and control processors as known in the art. In this example, the network switching controller with dynamic switching decision configuration 126 is implemented as a programmed processor. However, it will be recognized that any suitable structure may be employed such as, but not limited to, application specific integrated circuits, digital signal processors, field programmable gate arrays, state machines or any suitable combination of processors and/or discrete logic.

Each of the cellular wireless networks (WWANs) 106 and 108 may include a plurality of base stations 140, 142 and 146 and 148 respectively as known in the art. Although not shown, the plurality of networks may be coupled to the Internet or any other suitable networks as known in the art. A server 150, also referred to as a network switching decision control server is in operative communication with the networks 106 and 108 and wireless mobile device 102 dynamically provides configuration information for a plurality of different network switching decision modules as further set forth below. The configuration information may be stored in a database 152, or in any other suitable mechanism. The server 150 receives queries and provides responses through any suitable communication link generally shown as 154 and 156.

Figure 2:
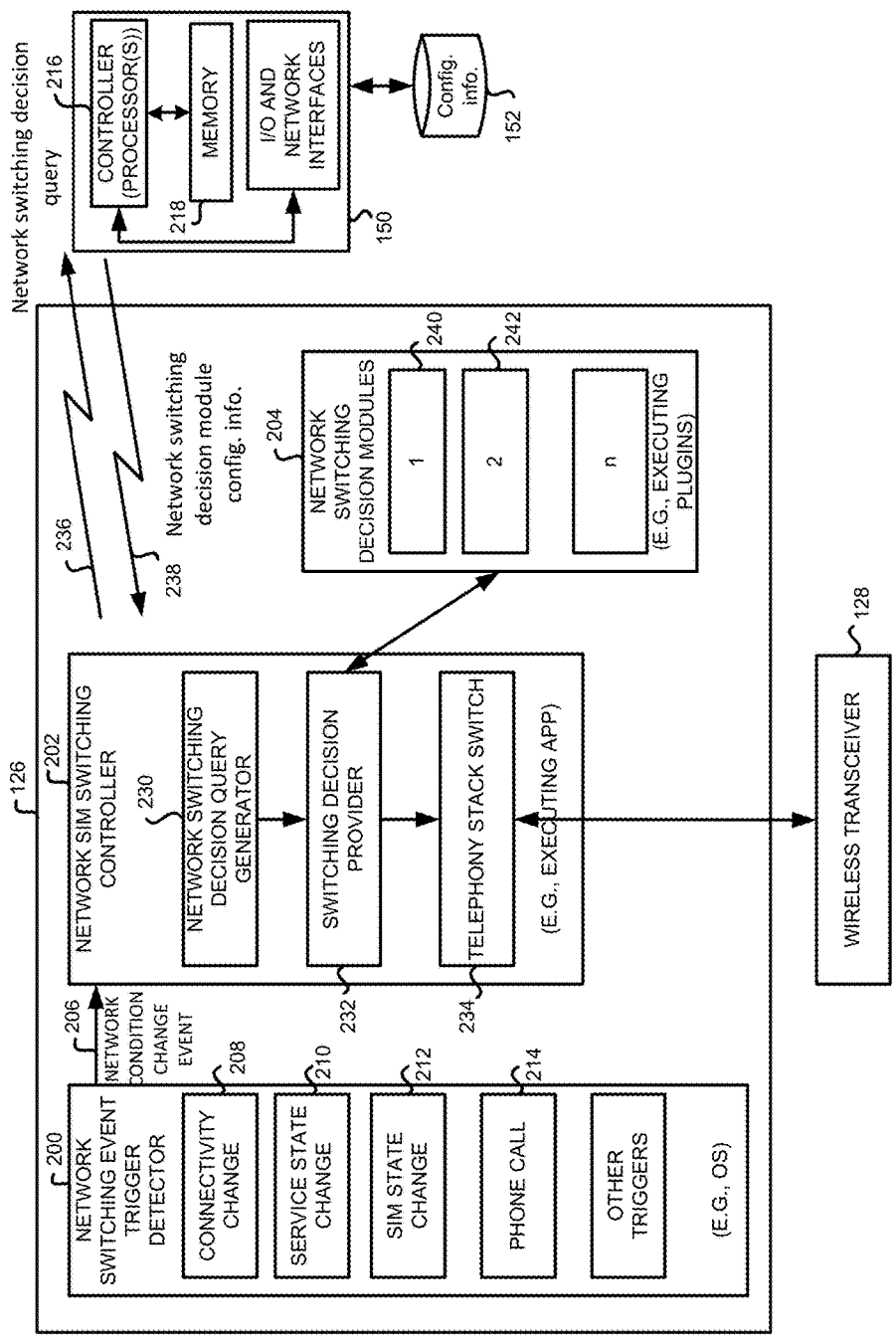
FIG. 2 illustrates a wireless mobile device communicating with a server in accordance with one example set forth in the disclosure.

Referring to FIG. 2, a more detailed functional block diagram of the network switching controller with dynamic switching decision configuration 126 is shown. In one example, the network switching controller 126 is implemented as one or more processors that execute instructions that are stored in memory 130 that when executed, cause the processor to carry out the operations described herein. The executable code may be implemented as one or more applications, apps, or any other suitable structure that may communicate with appropriate APIs, operating systems, services or any other processes as needed.

The memory 130 serves as a non-transitory storage medium that may take any suitable form including, but not limited to any suitable form of RAM, ROM, or any other suitable non-transitory storage medium. This would also include memory distributed in multiple web servers, in a single web server or in any suitable server. In this example, the network switching controller 126 is implemented as one or more processors executing an application wherein the processor also executes an operating system and any suitable APIs and services. The network controller 126 in this example, includes a network switching event trigger detector 200, a network SIM switching controller 202 and a plurality of network switching decision modules 204. The network switching event trigger detector 200 is implemented by the processor as part of an operating system which communicates with other application's services a network condition change event 206. However, this operation can be part of the network switching controller 126 or any suitable component.

A network condition change event 206 serves as a trigger event to wake up or activate the network SIM switching controller. The network condition change event 206 includes, but is not limited to one or more of the following events: a detection that there is a connectivity change 208 from one RAT to another such as for example, from an LTE to 3G change; a service state event 210 which is triggered, for example, when a voice service state is changed such as when the mobile device changes from an in service mode to an out of service mode; a SIM state event 212 which is triggered when a SIM state is changed such as when a status change is from a "no SIM" to a "SIM ready" state; and when a phone call 214 is in progress or when a phone call is not in progress. Examples of the connectivity change may be, for example, whether there has been a change by the wireless mobile device from an LTE network to a 3G network on the same carrier. This may indicate, for example, that switching to another carrier that can provide LTE service would be desirable. Other triggers may also be used. When these events are detected by the network switching event trigger detector 200, the network SIM switching controller 202 is woken up, in one embodiment or may be otherwise activated.

The network SIM switching controller 202 may be implemented on the processor as executing application code or in any other suitable form including, but not limited to, a state machine, or any other suitable logic. The network switching decision modules 204 in this example are stored executable code segments that execute on the processor and are stored in suitable memory such as RAM or ROM (for example, memory 130) and is shown in this diagram as being loaded for execution by processor.

The server 150 includes a controller 216 such as one or more processors that are in communication with memory 218 that stores executable instructions that when executed by the controller 216, cause the controller to operate as described herein. The server 150 also has input and output devices such as one or more displays, audio interface, graphic user interface, as well as network interfaces as known in the art. However, unlike known servers, server 150 via controller 216 presents an administrator with a graphic user interface or other user interface to allow input of configuration information 152 corresponding to each of the plurality of network switching decision modules 204 is further described below.

The network SIM switching controller 202 includes network switching decision query generator 230, a switching decision provider 232, and telephony stacked switch 234. In operation, the network switching decision query generator 230 issues a network switching decision query 236 to dynamically obtain from the server 150 configuration information 152 for the plurality of different network switching decision modules 204. This is done in response to the network SIM switching controller 202 receiving the network condition change event 206. In response to the network switching decision query 236, the server 150 issues a response 238 that includes network switching decision module configuration information 152 for the network SIM switching controller 202. The network SIM switching controller 202 then selectively invokes the network switching decision modules 204 that are enabled by the obtained configuration information. Each of the network switching decision modules that are enabled, designated in this example to be network switching decision modules 240 and 242, generate network switching decision data which indicates whether the particular network switching decision module has decided that a switch should be made to a different network carrier. Network condition information (e.g., signal strength, bandwidth levels, etc.) on a current network being used by the wireless mobile device is reevaluated by the enabled network switching decision modules and a decision is made by the network SIM switching controller 202 to determine whether a switch should be made to another carrier network.

Each of the network switching decision modules 204 use a different decision algorithm to make a determination. Any suitable decision algorithms may be employed including, but not limited to, switching algorithms that employ client side heuristic information, those that obtain real time network quality information from a server, peer devices or other source, those that use a network quality score based on one or more of the following factors: a type of telecommunication technology, the service provider of the network and historically observed communication speeds for the network. Once a final decision has been made to switch to a different carrier network, the switching decision provider 232 informs the telephony stacks 234 to perform a switching operation from the current carrier network to a different carrier network based on the switching decision data from the enabled network switching decision modules 240 and 242. Once switched to the other network carrier, the wireless mobile device may communicate on the network. The wireless transceiver 128 is used to effect the communication on the new carrier network and is used in the switching process as known in the art.

Figure 3:
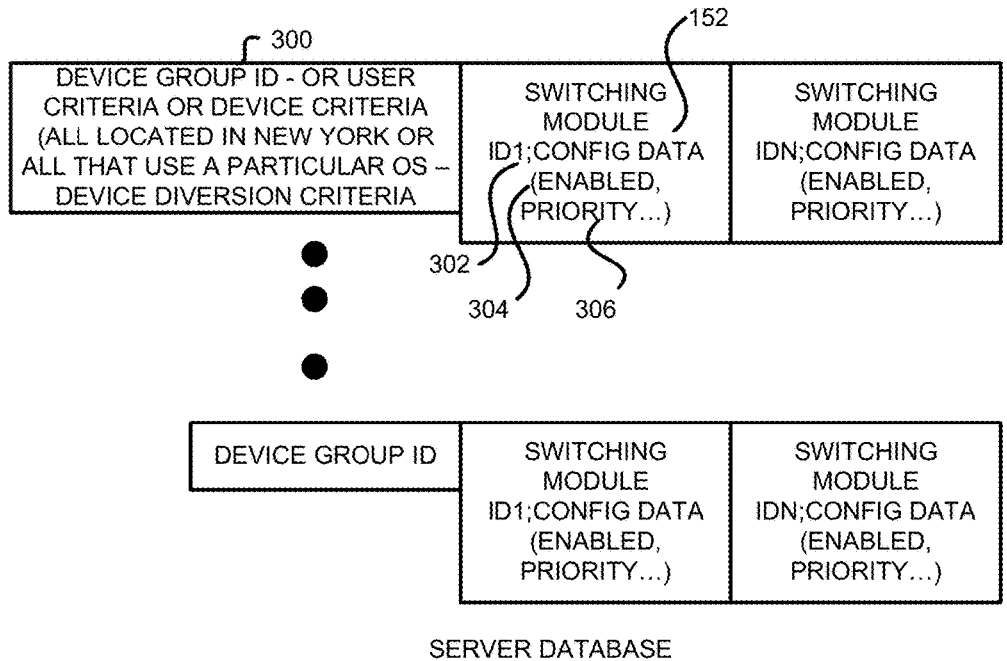
FIG. 3 diagrammatically illustrates network switching decision module configuration information in accordance with one example set forth in the disclosure.

Referring to FIG. 3, an example of network switching decision module configuration information 152 is illustrated. The network switching decision module configuration information 152 is stored by the server 150 for example, in a database or in any other suitable manner. In this example, a requesting entity identifier 300 is stored as an index so that when a wireless mobile device issues the network switching decision query 236, which contains the requesting entity identifier 300, the server 150 can locate the corresponding configuration information 152. An example the requestor entity identifier (ID) includes for example, a group ID that identifies a group of devices that have a same state. A state may be, for example, a geographic area (such as the same city), a state of a software component or hardware in the device (such as a particular operating system version), or any other suitable identifier data.

A different requesting entity identifier 300 is stored for each of a plurality of wireless mobile devices, or groups of wireless mobile devices. It is recognized that a single mobile device may have multiple users that can configure the device differently and as such, there may be multiple requesting entity identifiers for one wireless mobile device. Each requesting entity identifier 300 is linked to or associated with switching module identification data 302 which identifies a particular network switching decision module 204 in the wireless mobile device. The switching module identifier 302 is linked with configuration data 152 which includes data indicating that a particular network switching decision module is enabled for the wireless mobile device (shown as data 304). If desired, the switching module identifier 302 may also be linked with data 306 indicating a priority level of a particular network switching decision module 204.

Figure 4:
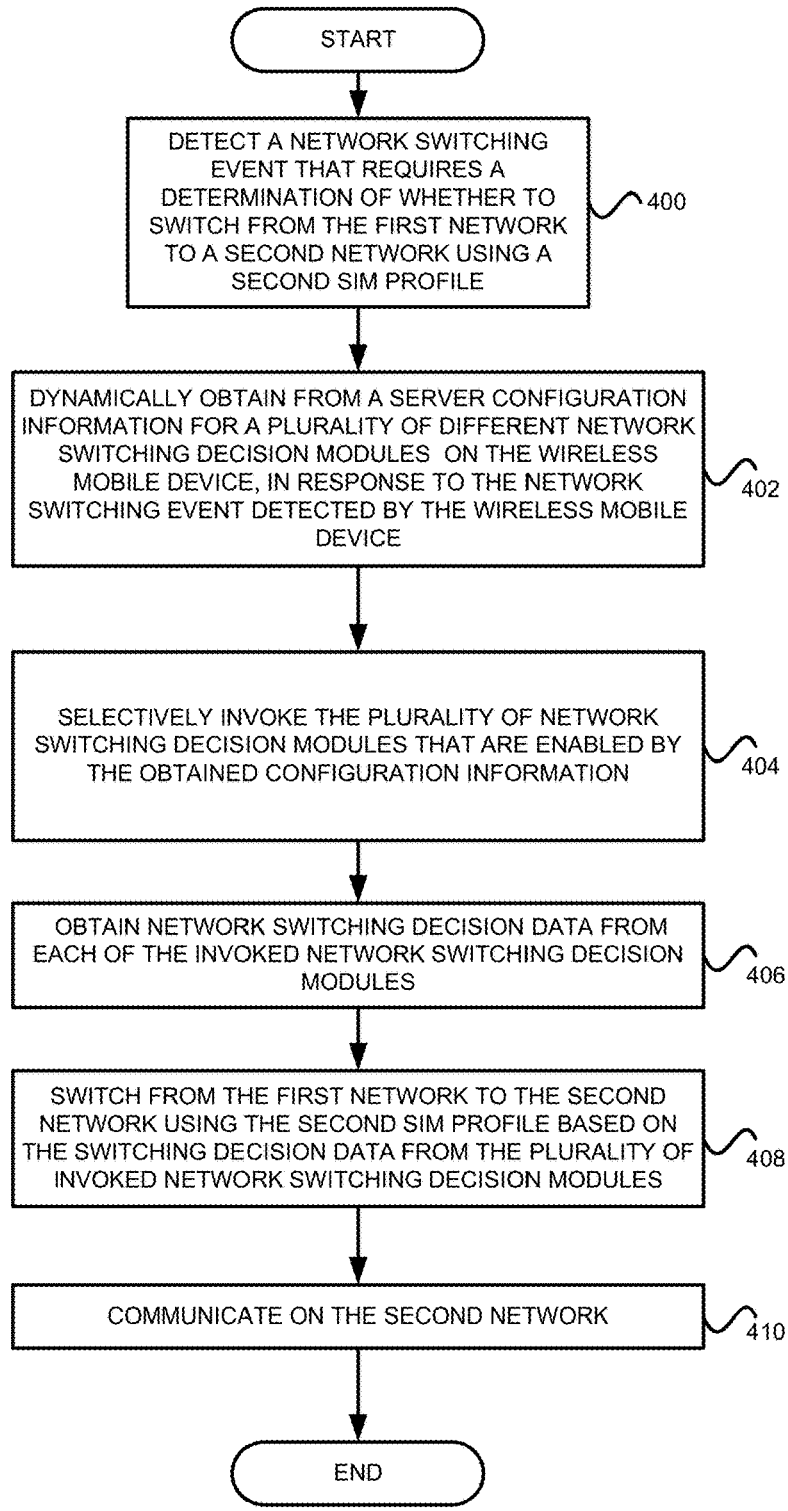
FIG. 4 illustrates a method carried out by a wireless mobile device in accordance with one example set forth in the disclosure.

Referring also to FIG. 4, which illustrates one example of a method carried out by the wireless mobile device, the operation of the network controller 126 will be described. As shown in block 400, the method includes detecting the network condition change event 206. This may be done, for example, by an operating system obtaining or receiving notifications from differing services, as known in the art, that indicate for example a connectivity change 208, service state change 210, SIM state change 212, a phone call state 214 or any other suitable trigger. In one example, the network condition change event 206 is detected and serves as a trigger event to wakeup the network SIM switching controller 202. The network SIM switching controller 202 may be in a low power state or in an off state to save battery power of the wireless mobile device. When a network condition change event is detected by the operating system, the operating system may call the network SIM switching controller 202 to effectively wakeup the controller to begin the process of determining whether to switch to another network. In this example, the network condition change event 206 requires a determination by the network SIM switching controller 202 of whether to switch from the first network to the second network using another SIM profile. For example, although a network condition change event 206 is triggered, the wireless mobile device may be better suited to stay on the current carrier network. It will be recognized that the network condition change event 206 may also indicate to the network SIM switching controller 202 that a network change must occur. However for purposes of illustration, the switching decision provider 232 is employed to make a decision as to whether to switch from a current carrier network to a different carrier network.

As shown in block 402, the method includes dynamically obtaining from the server 150, configuration information 152 for the plurality of different network switching decision modules 204 on the wireless mobile device. This is done in response to the detected network condition change event 206. By way of example, in response to the network SIM switching controller 202 receiving a network condition change event 206, the network SIM switching controller wakes up and issues the network switching decision query 236 using the network switching decision query generator 230. The network switching decision query generator 230 communicates the query 236 via the wireless transceiver 128 to the server 150. The network switching decision query generator then informs the switching decision provider 232 that a query has been sent and a response 238 has been received. The network SIM switching controller 202 having received the response 238 which includes the network switching decision module configuration information 152, selectively invokes only the network switching decision modules 204 that are enabled by the obtained configuration information in the response 238. In this example, it is network switching decision modules 240 and 242 that have been designated as being enabled. The network SIM switching controller 202 uses the switching decision provider 232 to invoke the network switching decision modules that have been enabled.

The network switching decision modules that have been enabled, 240 and 242 are then provided with their necessary network information and other criteria needed for their respective decision algorithms so that each network switching decision module can produce respective switching decision data. The switching decision provider 232 obtains the network switching decision data from each of the invoked network switching decision modules 240 and 242 and makes a decision as to whether the wireless mobile device is to switch from a first network to a second network. In one example, the switching decision provider 232 uses the priority data 306 that is sent as part of the configuration data 152 and choses the decision from the highest priority network switching decision module as the basis for deciding whether to switch from a first carrier network to a second carrier network. For example, the network SIM switching controller 202 dispatches all available conditions of the current network to the enabled network switching decision modules so that each can carry out its switching algorithm to determine a switching decision. A response, in the form of network decision switching data from each of the network switching decision modules may be, for example, data representing no opinion when a network switching decision module cannot make any decision at this particular moment, or data representing a list of blacklisted SIM profiles (carrier networks) that the network switching decision module believes will perform poorly, or data representing whitelisted SIM profiles which the network switching decision module believes will perform well in the current conditions.

In one example, the priority data 306 associated with each of the switching modules as received from the server dictates which decision controls. The priority data 306 can be determined empirically through experimentation and uploaded by an administrator through a user interface on the server 150. In another example, each network switching decision module 240 and 242 may output a confidence level with their respected decisions. The higher confidence level decision would be the decision used by the switching decision provider to indicate whether a switch should be done from a current network to a different carrier network. For example a confidence level of 80% issued by one of the network switching decisions modules would be selected as the final decision.

If desired, the switching decision provider 232 can also consider whether a decision will cause usage interruption and if so, will avoid switching to a different network. This may occur, for example, if a phone call network condition change event 214 is indicated meaning that a current phone call is taking place, switching to another carrier network may cause the call to drop therefore although another carrier network may have been decided as an appropriate network to switch to, the decision may be overridden because of the type of network condition change event 206.

Where, for example, there are three network switching decision modules that have been enabled by the configuration information 152, when the wireless mobile device moves into a shopping mall, the first carrier network may change from a carrier's LTE to the same carrier's 3G radio access technology. This is an event that the network SIM switching controller 202 (e.g., the switching decision provider 232) considers worthy to monitor, this is a connectivity event. The network SIM switching controller 202 is woken up and the three network switching decision modules are invoked. Each of the network switching decision modules may wish to use the data indicating that a network dropped LTE and used 3G as an input to its respective decision process. Each of the network switching decision modules then provides its network switching decision data which is then evaluated by the controller 202.

Each of the network switching decision modules 204, in one example, are independent so that one network switching decision module does not need to know that another network switching decision module is enabled or not. There is suitable isolation of the network switching decision modules so that each network switching decision module is effectively a standalone module which can be enabled or disabled without affecting other components in a system. The network SIM switching controller 202 communicates with the server 150 to load the state of each network switching decision module to enable/disable the network switching decision module remotely.

When there is a new network switching decision module to be run or tested, the new network switching decision module can be stored at the server 150 and provisioned as part of the response 238 and then stored in the wireless mobile device and executed. The network SIM switching controller in this example logs the behavior of the network switching decision module and provides the information to the server 150 using another communication and the logged behavior information may then be stored at the server 150 and used by an administrator to analyze the operation of the experimental network switching decision process. In one example, the network SIM switching controller 202 may employ an API to communicate with the network switching decision modules when they are implemented as stored executing code segments.

Also, improving cellular network carrier switching algorithms can require much experimental work due to the varying connectivity disparities based on real world conditions. One or more of the following advantages can be provided. These include an automatic network switching algorithm system that allows for easy addition or removal of network switching decision algorithms for a mobile device for experimental purposes or other purposes. A centralized approach is provided through the server where control is provided to allow the changing of different network switching decision algorithms to be enabled on a wireless mobile device. Switching decisions from multiple network switching decision modules may be employed simultaneously so that a best switching decision is made.

Referring back to FIG. 4, as shown in block 404, the network decision provider 232 invokes the network switching decision modules that are enabled by the obtained configuration information. The method also includes obtaining 406 the network switching decision data produced from each of the invoked network switching decision modules which may data, for example, that indicates that one or more profiles are blacklisted, whitelisted or that a decision cannot be made. Any other suitable decision data may also be employed. As shown in block 408, the switching decision provider then informs the telephony stack switch 234 to switch to the designated wireless carrier using the wireless transceiver 128. The wireless mobile device then communicates on the new carrier network as in block 410. When the network SIM switching controller 202 is controlled to wakeup in response to the network condition change event occurring, the method also includes placing the network SIM switching controller 202 in a reduced power state after it has completed its decision process or after the telephony stack switch has confirmed that the switch to the network carrier has been made. The network SIM switching controller stays in reduced power state until another network condition change event 206 causes a wakeup of the network SIM switching controller. This provides improved battery life for the mobile wireless device. When priority data is included in the configuration information, the method includes using the obtained configuration information from the server to prioritize network switching data among the differing selectively invoked network switching decision modules.

Figure 5:
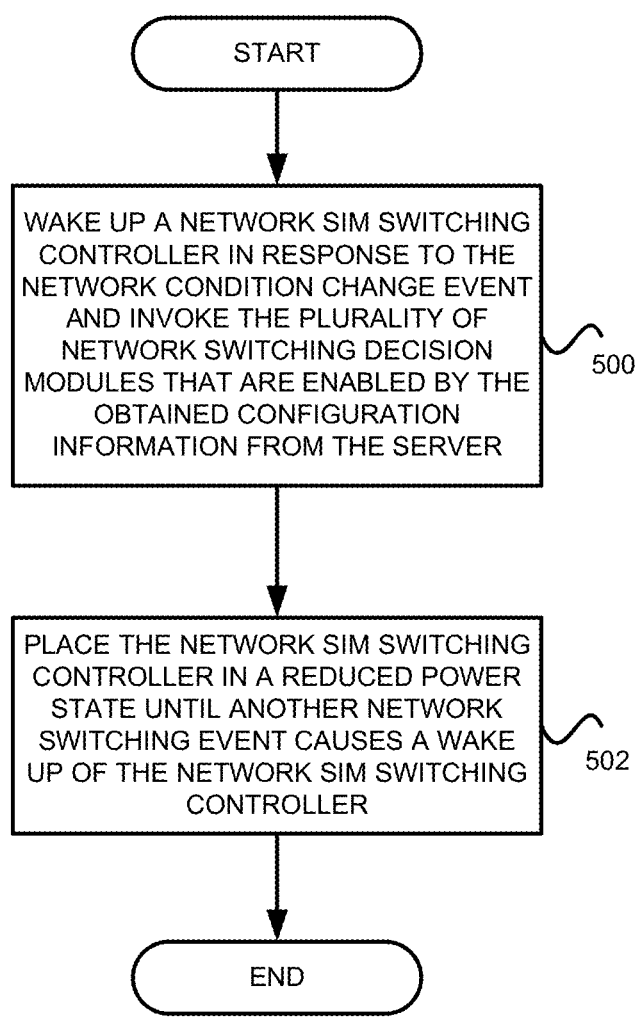
FIG. 5 is a method carried out by a wireless mobile device in accordance with one example set forth in the disclosure.

FIG. 5 illustrates one example of the operation of the network SIM switching controller 202 as described above which includes, for example, the network switching event trigger detector 200 waking up the network SIM switching controller as shown in block 500. This is done in response to the network's condition change event 206. The method includes invoking the plurality of network switching decision modules that are enabled by the obtained configuration information 152 from the server. This is done in this example by the switching decision provider 232. As shown in block 502, the method includes placing the network SIM switching controller 202 in a reduced power state until another network condition change event causes a wakeup of the network SIM switching controller. This is done by the switching decision provider 232

Figure 6:
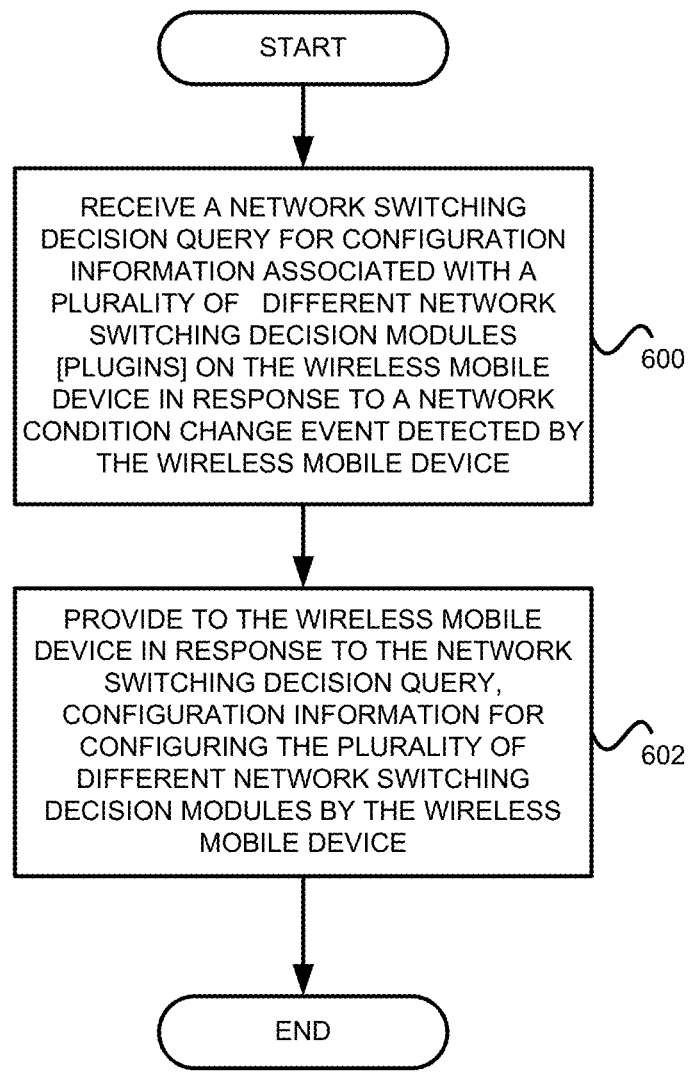
FIG. 6 is a method carried out by a server in accordance with one example set forth in the disclosure.

FIG. 6 illustrates one example of a method carried out by the server 150. As shown in block 600, the controller 216 receives a network switching decision query 236 via the appropriate network interface, from the wireless mobile device. The network switching decision query 236 queries for configuration information associated with a plurality of different network switching decision modules for the requesting wireless mobile device. The network switching decision query 236 as received by the server in response to a network condition change event being detected by the network switching event trigger detector 200. As shown in block 602, the controller evaluates the database using the entity ID information that was included in the network switching decision query 236 from the wireless mobile device to locate the stored records indicating the configuration information for the plurality of differing switching decision modules on the wireless mobile device. The controller 216 issues the response 238 to provide the corresponding configuration information 152 for configuring the plurality of different network switching decision modules by the wireless device. The network switching decision modules 240 and 242 are dynamically registered to the network SIM switching controller via the configuration information 150 received from the server 150.

A type of dynamic framework is disclosed which allows the activation, deactivation and changing of differing network switching decision algorithms on a wireless mobile device to provide improved network switching decisions when switching to a different carrier network. Other advantages will be recognized by those of ordinary skill in the art.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

The above detailed description and the examples described therein have been presented for the purposes of illustration and description only and not for limitation. For example, the operations described may be done in any suitable manner. The methods may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A method by a wireless mobile device that supports a plurality of subscriber identification module (SIM) profiles where a first SIM profile is used to communicate with a first wireless network and a second SIM profile is used to communicate with a second wireless network, the method comprising:

in response to a detected network condition change event while the wireless mobile device communicates with the first wireless network, dynamically obtaining, by the wireless mobile device, from a server in communication with the wireless mobile device, configuration information for enabling a plurality of different network switching decision modules on the wireless mobile device, wherein each network switching decision module of the plurality of different network switching decision modules on the wireless mobile device individually determines whether the wireless mobile device should switch from the first wireless network to another wireless network;

for each network switching decision module of the plurality of different network switching decision modules that are enabled by the obtained configuration information:

selectively invoking, by the wireless mobile device, the respective network switching decision module to execute a respective network switching decision algorithm that is different than the respective network switching decision algorithms executed by the other invoked network switching decision modules; and obtaining, by the wireless mobile device, from the respective network switching decision module, respective network switching decision data generated by executing the respective network switching decision algorithm, the respective network switching decision data indicating whether the wireless mobile device should switch from the first wireless network to another wireless network;

switching, by the wireless mobile device, from the first wireless network to the second wireless network using the second SIM profile based on the network switching decision data obtained from the plurality of different invoked network switching decision modules; and communicating, by the wireless mobile device, on the second wireless network.

2. The method of claim 1, further comprising:

waking up a network SIM switching controller in the wireless mobile device in response to the network condition change event; and placing the network SIM switching controller in a reduced power state until another network condition change event causes a wake up of the network SIM switching controller.

3. The method of claim 1, further comprising detecting, by the wireless mobile device, the network condition change event and wherein switching, by the wireless mobile device, from the first wireless network to the second wireless network further comprises using the obtained configuration information from the server to prioritize the network switching decision data obtained from the plurality of different selectively invoked network switching decision modules.

4. The method of claim 1, wherein dynamically obtaining configuration information for enabling the plurality of different network switching decision modules comprises obtaining from the server at least one of: data indicating that a particular network switching decision module is enabled for the wireless mobile device; or data indicating a priority level of a particular network switching decision module.

5. A wireless mobile device that supports a plurality of subscriber identification module (SIM) profiles where a first SIM profile is used to communicate with a first wireless network and a second SIM profile is used to communicate with a second wireless network, the wireless mobile device comprising:

a wireless transceiver operative to communicate with the first and second wireless networks;

memory comprising executable instructions;

one or more processors, operatively coupled to the wireless transceiver and the memory, the one or more processors, when executing the executable instructions configured to:

in response to a detected network condition change event while the wireless mobile device communicates with the first wireless network, dynamically obtain from a server in communication with the wireless mobile device, configuration information for enabling a plurality of different network switching decision modules on the wireless mobile device, wherein each network switching decision module of the plurality of different network switching decision modules on the wireless mobile device individually determines whether the wireless mobile device should switch from the first wireless network to another wireless network;

for each network switching decision module of the plurality of different network switching decision modules that are enabled by the obtained configuration information:

selectively invoke the respective network switching decision module to execute a respective network switching decision algorithm that is different than the respective network switching decision algorithms executed by the other invoked network switching decision modules; and obtain from the respective network switching decision module, respective network switching decision data generated by executing the respective network switching decision algorithm, the respective network switching decision data indicating whether the wireless mobile device should switch from the first wireless network to another wireless network; and cause switching by the wireless transceiver, from the first wireless network to the second wireless network using the second SIM profile based on the network switching decision data obtained from the plurality of different invoked network switching decision modules.

6. The wireless mobile device of claim 5, wherein the one or more processors are configured to:

wake up a network SIM switching controller in response to the network condition change event; and place the network SIM switching controller in a reduced power state until another network condition change event causes a wake up of the network SIM switching controller.

7. The wireless mobile device of claim 5, wherein the one or more processors are further configured to detect the network condition change event and switch from the first wireless network to the second wireless network using the obtained configuration information from the server to prioritize the network switching decision data obtained from the plurality of different selectively invoked network switching decision modules.

8. The wireless mobile device of claim 5, wherein the one or more processors are configured to dynamically obtain the configuration information for enabling the plurality of different network switching decision modules by obtaining from the server at least one of: data indicating that a particular network switching decision module is enabled for the wireless mobile device; or data indicating a priority level of a particular network switching decision module.

9. A non-transitory storage medium comprising stored executable instructions that when executed by one or more processors causes the one or more processors to:

in response to a detected network condition change event while the wireless mobile device communicates with the first wireless network, dynamically obtain from a server in communication with the wireless mobile device, configuration information for enabling a plurality of different network switching decision modules on the wireless mobile device, wherein each network switching decision module of the plurality of different network switching decision modules on the wireless mobile device individually determines whether the wireless mobile device should switch from the first wireless network to another wireless network;

for each network switching decision module of the plurality of different network switching decision modules that are enabled by the obtained configuration information:
  selectively invoke the respective network switching decision module to execute a respective network switching decision algorithm that is different than the respective network switching decision algorithms executed by the other invoked network switching decision modules; and
  obtain from the respective network switching decision module, respective network switching decision data generated by executing the respective network switching decision algorithm, the respective network switching decision data indicating whether the wireless mobile device should switch from the first wireless network to another wireless network; and
cause switching by the wireless transceiver, from the first wireless network to the second wireless network using the second SIM profile based on the network switching decision data obtained from the plurality of different invoked network switching decision modules.

10. The non-transitory storage medium 9, wherein the stored executable instructions that when executed by the one or more processors further causes the one or more processors to:
wake up a network SIM switching controller in response to the network condition change event; and
place the network SIM switching controller in a reduced power state until another network condition change event causes a wake up of the network SIM switching controller.

11. The non-transitory storage medium 9, wherein the stored executable instructions that when executed by the one or more processors further causes the one or more processors to:
detect the network condition change event; and
switch from the first wireless network to the second wireless network by using the obtained configuration information from the server to prioritize the network switching decision data obtained from the plurality of different selectively invoked network switching decision modules.

12. The non-transitory storage medium 9, wherein the stored executable instructions that when executed by the one or more processors causes the one or more processors to dynamically obtain the configuration information for enabling the plurality of different network switching decision modules by obtaining from the server at least one of: data indicating that a particular network switching decision module is enabled for the wireless mobile device; or data indicating a priority level of a particular network switching decision module.

* * * * *